United States Patent
Santoni

(10) Patent No.: US 12,533,857 B2
(45) Date of Patent: Jan. 27, 2026

(54) TAPE DEPOSITION SYSTEM

(71) Applicant: McLaren Automotive Limited, Woking (GB)

(72) Inventor: Claudio Santoni, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 18/033,219

(22) PCT Filed: Oct. 21, 2021

(86) PCT No.: PCT/GB2021/052727
§ 371 (c)(1),
(2) Date: Apr. 21, 2023

(87) PCT Pub. No.: WO2022/084681
PCT Pub. Date: Apr. 28, 2022

(65) Prior Publication Data
US 2023/0391022 A1 Dec. 7, 2023

(30) Foreign Application Priority Data
Oct. 21, 2020 (GB) .................................. 2016678

(51) Int. Cl.
B29C 70/38 (2006.01)
B65H 35/00 (2006.01)

(52) U.S. Cl.
CPC ....... B29C 70/388 (2013.01); B65H 35/0033 (2013.01)

(58) Field of Classification Search
CPC ... B29C 70/388; B29C 70/386; B29C 70/384; B29C 70/382; B29C 70/38; B65H 35/0033
See application file for complete search history.

(56) References Cited

U.S. PATENT DOCUMENTS 10,059,067 B2 8/2018 Vaniglia et al.
2003/0164578 A1* 9/2003 Brown ................. B29C 70/305
425/453
2012/0269999 A1 10/2012 Kind et al.
(Continued)

FOREIGN PATENT DOCUMENTS

DE 102015002775 9/2016
KR 20180132247 12/2018

OTHER PUBLICATIONS

Search Report in United Kingdom Appln. No. GB2016678.1, mailed on May 8, 2024, 5 pages.
(Continued)

Primary Examiner — George R Koch
(74) Attorney, Agent, or Firm — Fish & Richardson P.C.

(57) ABSTRACT

A tape deposition system, the system comprising: a platform moveable around a closed path in a first direction, the platform having a deposition surface; and a tape deposition head configured to apply lengths of tape along a deposition direction to the deposition surface, the platform being moveable past the deposition head around the closed path along the deposition direction to apply lengths of tape to the deposition surface; and wherein the system is configured to move the platform around the path multiple times to permit multiple lengths of tape to be applied to the deposition surface.

20 Claims, 8 Drawing Sheets

(56) References Cited

U.S. PATENT DOCUMENTS

| | | |
|---|---|---|
| 2015/0306826 A1 | 10/2015 | Borgmann et al. |
| 2016/0368729 A1 | 12/2016 | Ufer |
| 2017/0203522 A1 | 7/2017 | Vaniglia et al. |
| 2018/0036966 A1* | 2/2018 | Boge ................... B29C 70/38 |
| 2020/0139649 A1* | 5/2020 | Modin ................ B29C 70/545 |
| 2020/0147905 A1 | 5/2020 | Shaw et al. |
| 2020/0215767 A1* | 7/2020 | Danninger ............. B29C 70/38 |

OTHER PUBLICATIONS

International Search Report and Written Opinion in International Appln. No. PCT/GB2021/052727, mailed Jan. 27, 2022, 14 pages.

Search Report in United Kingdom Appln. No. GB2016678.1, dated Jun. 15, 2021, 4 pages.

Search Report in United Kingdom Appln. No. 2500040.7, mailed on Jan. 17, 2025, 5 pages.

\* cited by examiner

TAPE DEPOSITION SYSTEM

CROSS-REFERENCE TO RELATED APPLICATIONS

The present application is the national stage entry of International Patent Application No. PCT/GB2021/052727, filed on Oct. 21, 2021, and claims priority to Application No. GB2016678.1, filed in the United Kingdom on Oct. 21, 2020, the disclosures of which are incorporated herein by reference thereto.

FIELD OF THE INVENTION

This invention relates to a tape deposition system.

BACKGROUND

Carbon fibre preforms, boat sails and garments are examples of articles that are made by joining together multiple pliable sheets of material. When such articles are being manufactured it is necessary to bring those sheets together in a desired relationship before the sheets are adhered together. The sheets may then be transferred to a machines that can fix them together permanently. These processes can be difficult because the size of the sheets, and their pliable nature, can make them difficult to handle. For illustration, a typical carbon fibre preform is made up of multiple sheets of carbon fibre material of particular shapes and sizes. These need to be brought together, or laid up, so that they overlap in desired locations and with the weave of each sheet in a desired orientation. Arranging the sheets in this way gives the eventual structure certain strength characteristics as intended by the designer. The complexity of the lay-up task means that it is normally done by hand, especially when making parts that have been highly optimised and have complex lay-up requirements. Laying up the sheets by hand is expensive, leads to inconsistency in the resulting products, and can be unpleasant for the workers due to irritations from stray carbon fibres and other chemicals that are used in the process.

Each sheet of material has a desired shape. These sheets are generally cut out of a larger piece of material to have the desired shape. This can generate significant amounts of waste material as the larger piece of material needs to be big enough that the whole of the desired shape can fit inside of it. In addition, there is a risk that the shape may not be cut accurately from the larger piece of material again leading to inconsistency in the resulting products.

Both of the problems described above cause difficulties when producing articles that are made by joining together multiple pliable sheets of material. These problems lead to discomfort for the workers, expense and variability in the final product. Similar problems arise in other areas. For instance, in garment manufactures and sail making it is common for individual piece of fabric to be assembled by hand and then stitched or fused together.

It would therefore be desirable for there to be an improved way of laying up sheets of material.

SUMMARY

According to a first aspect of the present invention there is provided a tape deposition system, the system comprising: a platform moveable around a path in a first direction, the platform having a deposition surface; and a tape deposition head configured to apply lengths of tape along a deposition direction to the deposition surface, the platform being moveable past the deposition head around the closed path along the deposition direction.

According to a second aspect of the present invention there is provided a tape deposition system, the system comprising: a platform moveable around a closed path in a first direction, the platform having a deposition surface; and a tape deposition head configured to apply lengths of tape along a deposition direction to the deposition surface, the platform being moveable past the deposition head around the closed path along the deposition direction to apply lengths of tape to the deposition surface; and wherein the system is configured to move the platform around the path multiple times to permit multiple lengths of tape to be applied to the deposition surface.

The system may comprise: a plurality of platforms movable around the path in the first direction, each platform may have a deposition surface and the platforms each may be moveable past the deposition head around the path along the deposition direction; and wherein the tape deposition head may be configured to apply lengths of tape along the deposition direction to each deposition surface. The platform(s) may be rotatable about an axis perpendicular to the deposition surface so that the deposition head can apply lengths of tape to the deposition surface along any direction.

The platform(s) may be translatable along a translation direction parallel to the deposition surface and perpendicular to the first direction so that the deposition head can apply lengths of tape to the deposition surface at positions offset along the translation direction.

The system may be configured to move the platform around the path multiple times to permit multiple lengths of tape to be applied to the deposition surface. At least some lengths of tape may be applied to other lengths of tape already applied to the deposition surface.

The system may comprise: at least one carriage, the platform(s) each may be borne on a respective carriage; and a first track that follows the path, each carriage may be moveable along the first track. The path may be a first path, and the system may comprise: a second track that follows a second path, the second path may run alongside the first track; and a mover for each carriage, each carriage may be connected to the second track by the respective mover so that relative movement of each carriage relative to the associated mover causes the carriage to rotate about the connection between the carriage and the first track.

The system may comprise: a plurality of tape deposition heads configured to apply lengths of tape to the deposition surface(s) along the deposition direction, the platform(s) may be moveable past the deposition heads around the path along the deposition direction. The deposition heads may be aligned in a bank one beside the other. The deposition heads may be arranged in multiple rows of deposition heads. The deposition heads in one row may be offset from the deposition heads in another row so that the deposition directions of the heads are offset from each other in a direction perpendicular to the deposition direction.

The deposition system may comprise: a platform management device configured to move the platform(s) between following the path and a storage location. The platform management device may be configured to move the platform (s) between respective carriages and the storage location. The platform management device may comprise a moveable arm having a grabbing head configured to selectively attach to the platform(s), the moveable arm may be configured to move the platform(s) between the path and a position remote from the path. The position remote from the path may be the storage location. The platform management device may comprise a conveyor; wherein the position remote from the path may be on the conveyor. The platform management device may comprise a conveyor, the conveyor may comprise a moveable portion configured to move between a raised position and a lowered position, wherein when the moveable portion is in the raised position the moveable portion does not impinge on the motion of the platform(s) and when the moveable portion is in the lowered position the moveable portion crosses the path of the platform(s) so that the moveable portion is capable of moving the platform to and/or from the path.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a tape deposition system. The system comprises a platform moveable around a path in a first direction, the platform having a deposition surface. The system further comprises a tape deposition head configured to apply lengths of tape along a deposition direction to the deposition surface, the platform being moveable past the deposition head around the closed path along the deposition direction.

Figure 1:
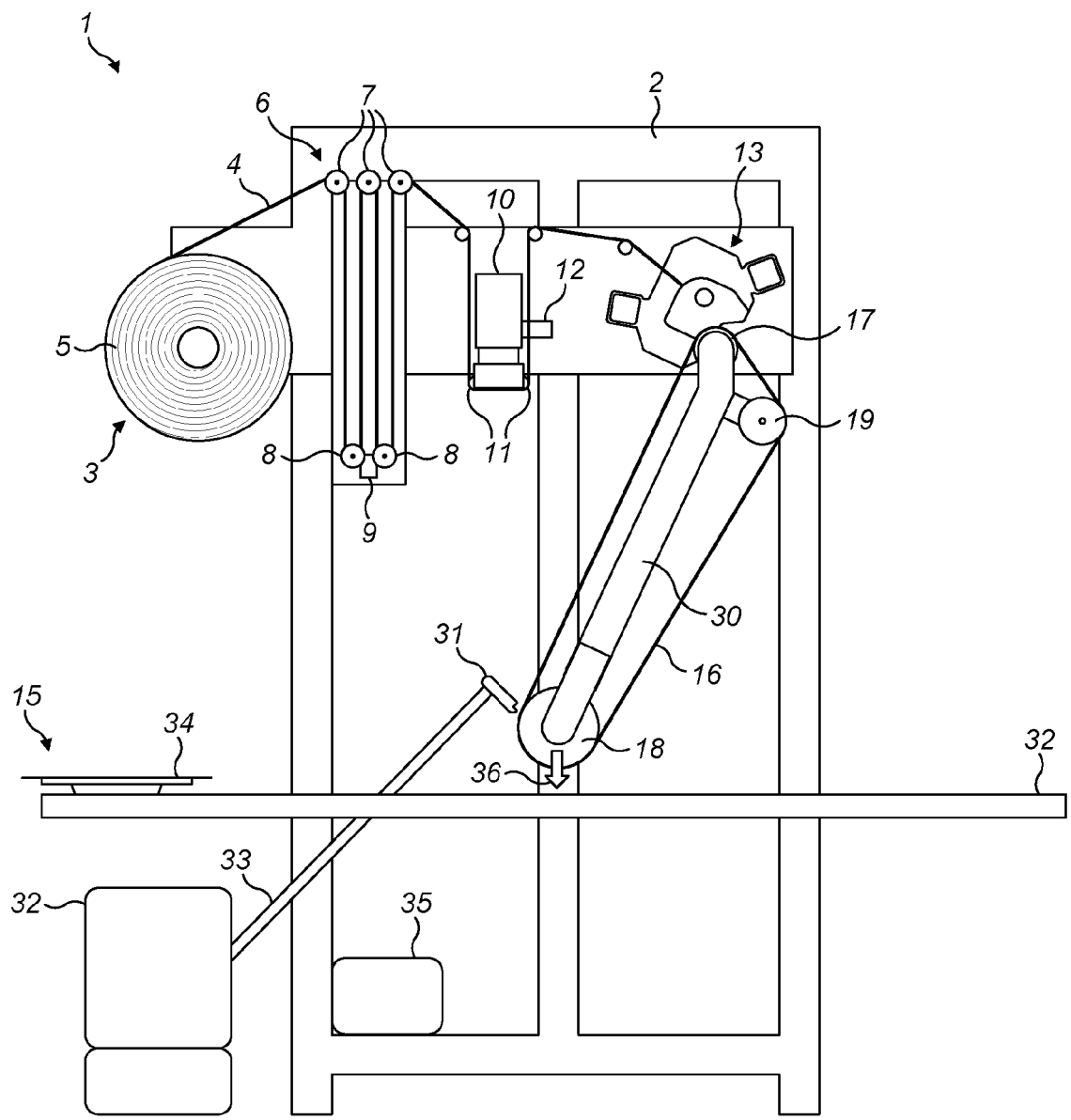
FIG. 1 shows a schematic side view of a tape deposition system.

FIG. 1 shows a tape deposition system 1. The tape deposition system 1 comprises a frame 2 to which components of the tape deposition system 1 are mounted. Other components of the tape deposition system 1 may be separately supported. For instance, components may stand on a floor that the frame also stands on. For at least some of the components of the tape deposition system 1 the spatial positioning of the components is important. In this case it can be advantageous if the components are mounted to the frame or connected to it so that their relative positioning can be maintained.

FIG. 1 shows a tape deposition system 1. The tape deposition system 1 comprises a frame 2 to which components of the tape deposition system 1 are mounted. Other components of the tape deposition system 1 may be separately supported. For instance, components may stand on a floor that the frame also stands on. For at least some of the components of the tape deposition system 1 the spatial positioning of the components is important. In this case it can be advantageous if the components are mounted to the frame or connected to it so that their relative positioning can be maintained.

The tape deposition system 1 comprises at least one reel 3 of tape 4. The tape 4 is wound around a spool 5. The tape 4 is wound around the spool 5 along the length of the tape. The width of the tape runs across the spool 5 in the axial direction of the spool 3. The tape 4 may be a fibre tape. The tape 4 may comprise carbon fibres. The tape may be a carbon fibre tape. A carbon fibre tape may comprise carbon fibres weaved into a mat. The carbon fibre tape may be constituted solely of carbon fibre or alternatively may include other materials as well as the carbon fibre.

The tape deposition system 1 comprises a tape buffer 6 which stores a length of the tape 4 within the tape buffer 6. The tape buffer 6 provides tension to the tape 4 as it passes through the tape deposition system 1. The tape 4 runs from the reel 3 to the tape buffer 6. The tape buffer 6 comprises a plurality of upper rollers 7 and at least one lower roller 8. The upper and lower rollers 7, 8 run lengthways across the width of the tape 4. In this way the rotation axis of the rollers is substantially perpendicular to the feed direction of the tape 4. The lower rollers 8 are moveable relative to the upper rollers 7 to alter the distance between the upper rollers 7 and the lower rollers 8. The lower rollers 8 may be held in position by one or more weights 9 attached to the lower rollers 8. The lower rollers 8 may be attached to a mount that is attached to the one or more weights 9. The moveable nature of the lower rollers 8 provides tension to the tape 4. As the tape 4 is drawn out of the tape buffer 6 the lower rollers can move upward to provide the required length of tape to the downstream parts of the tape deposition system 1. Additional tape 4 may be drawn into the tape buffer 6 from the reel 3 of tape 4. It may be that the downstream components of the tape deposition system 1 require tape 4 to be provided at a higher speed for a period of time than can be unwound from the reel 3. In this case, the tape buffer 6 can provide the additional tape 4 by the movement of the lower rollers 8 for that period of time. Then, when the downstream components do not require tape 4 to be provided, additional tape 4 can be unwound from the reel 3 to replenish the tape buffer 6.

The tape deposition system 1 comprises a tape splicer 10. This permits the tape 4 from one reel 3 to be joined to a second reel of tape 4. This may be required to join the tape 4 from the first reel 3 that is almost empty to another tape 4 from the second reel to permit continuous deposition of tape 4 by the tape deposition system 1. The tape splicer 10 includes splicer rollers 11 to control the flow of tape 4 through the tape splicer 10. Tape splicer 10 comprises a fuser 12 to join the two tapes together. The tape 4 passes from the tape buffer 6 to the tape splicer 10 and then through tape splicer 10. As shown in FIG. 1, additional rollers may be present to guide the tape 4 from the tape buffer 6 to the tape splicer 10.

The tape deposition system 1 comprises a tape cutter 13. The tape cutter 13 slices the tape 4 into lengths which are captured in turn by tape conveyor 14 for the movement of the tape length to a deposition platform 15. The tape deposition system 1 comprises the tape conveyor 14 and deposition platform 15. The tape cutter 13 is shown in more detail in FIG. 2.

The tape cutter has a tape inlet 28 and a tape outlet 29. The tape runs through the tape cutter from the tape inlet 28 to the tape outlet 29. The tape cutter 13 comprises a tape cutter body 24. The tape cutter 13 comprises a feed roller 20 rotatably mounted to the tape cutter body 24. The feed roller 20 has a rotational axis that is generally perpendicular to the feed direction of the tape 4. The feed roller 20 is coupled to a motor to drive the feed roller 20. The feed roller 20 may be selectively driven to feed tape 4 through the tape cutter 13. The feed roller 20 draws tape 4 from the tape buffer 6. The tape 4 runs over the feed roller 20 towards a rotatable slicer 21. To assist with the driving of the tape 4 by the feed roller 20, the tape cutter 13 comprises a pinch roller 25. The pinch roller 25 is located to press against the tape 4 from the opposite side of the tape 4 as feed roller 20. In this way, the tape 4 is located between pinch roller 25 and feed roller 20 and gripped between the two rollers. The pinch roller 25 is biased towards the feed roller 20 by a spring 26. The pinch roller 25 is mounted to tape cutter body 24.

The rotatable slicer 21 comprises at least one blade 22 attached to an arm 23. As pictured in FIG. 2, the rotatable slicer 21 may comprise two blades 22 mounted to the arm 23. The blades 22 may be mounted to the arm 23 at equal distances from the rotation axis of the arm 23. The blades 22 may be mounted symmetrically about the rotatable slicer 21. The arm 23 is rotatably mounted to the body 24 of the tape cutter 13. The rotatable slicer 21 is coupled to a motor to drive the rotatable slicer 21. The arm may be coupled to the motor so that it can selectively rotate about its rotation axis.

Figure 2:
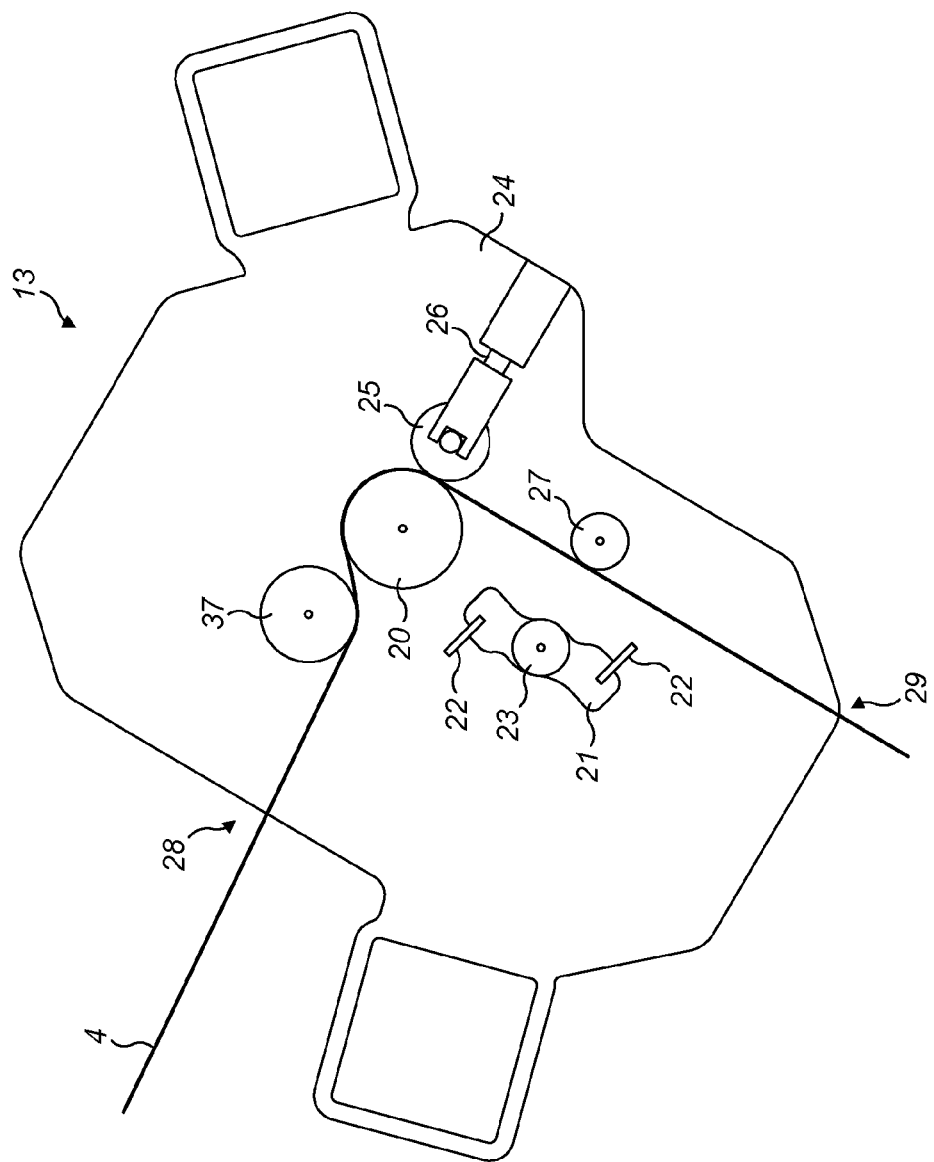
FIG. 2 shows a schematic side view of a tape cutter of the tape deposition system.

As pictured in FIG. 2, the two blades 22 may be mounted to the arm 23 at equal distances from the rotation axis of the arm 23 along a straight line running through the rotation axis of the arm 23. The blade(s) 22 have a cutting edge that is directed generally perpendicular to the rotation axis of the arm 23. The length of the arm 23 and the position of the blade(s) 22 is such that that the cutting edge of each blade 22 impinges on the tape 4 that projects from the feed roller 20 (and pinch roller 25 when present) towards tape conveyor 14 when the blade is at its closest to the tape 4. The impingement of the cutting edge on the tape 4 cuts the tape 4. The tape cutter 13 may comprise a cutting surface 27 against which the cutting edge of the blade forces the tape 4 to cut the tape 4. The cutting surface 27 may be a roller so that as the tape 4 is cut it moves towards the tape conveyor 14. The rotation of the arm 23 is controlled to cut the tape 4 to the desired length. The desired length of tape is fed by the feed roller 20 past the cutting surface 27 at which point the arm 23 is rotated to cause the blade 22 to cut the tape 4.

The tape cutter 13 may comprise an input roller 37 which is configured to guide the tape 4 into the tape cutter and on to feed roller 20. The input roller 37 is positioned to contact the tape 4 after it has entered the tape cutter 13.

The output of the tape cutter 13 is a length of tape 4. The length of tape is captured by the tape conveyor 14 for the movement of the tape length to the deposition platform 15. The tape conveyor 14 comprises a belt 16. The length of the belt 16 runs between the tape cutter 13 and an area above where the deposition platform 15 transits. The upper side of the belt runs directly between the tape cutter 13 and the deposition platform 15. The belt is orientated so as to run down from the tape cutter 13 to the deposition platform 15. The tape conveyor 14 comprises at least two rollers between which the belt 16 runs. A first conveyor roller 17, otherwise known as a capture roller 17, is located proximal to the tape cutter 13. The area of the belt 16 near the first conveyor roller 17 captures the cut length of tape from the tape cutter 13. A second conveyor roller 18, otherwise known a deposition roller 18, is located proximal to the transit path of the deposition platform 15. One of the first and second rollers may be driven by a motor to cause the belt 16 to move. The belt 16 is driven in an anti-clockwise direction as orientated in FIG. 1. The belt 16 is driven so that the tape moves along an upper surface of the belt 16 from the first conveyor roller 17 to the second conveyor roller 18. The upper surface of the belt 16 may be a capture surface of the tape conveyor 14. The length of tape is conveyed from the tape cutter 13 to the deposition platform by the capture surface of the tape conveyor 14. The upper surface of the belt 16 is defined by the region of the belt 16 that faces upwards for the collection of the length of tape 4 at any given movement.

The tape conveyor 14 may comprise a third roller in contact with the belt away from the capture surface of the tape conveyor 14. The third roller 19 may tension the belt 16. The third roller 19 may be mounted on a resilient biasing device such as a spring to push against the belt 16 to tension the belt 16. The third roller 19 may be driven by a motor to cause the belt 16 to move around the length of the belt 16.

The tape conveyor 14 comprises a vacuum chamber 30. The vacuum chamber 30 is connected to a pump to draw air from the vacuum chamber 30 to create an area of lower air pressure than in the surrounding space. The vacuum chamber 30 comprises an interface in the face of the vacuum chamber 30 that faces the capture surface of the tape conveyor 14. The interface causes a lower air pressure to be formed on the surface of the belt in the capture surface than in the surrounding air. This lower air pressure causes the lengths of tape to be pulled against the belt 16 along the capture surface. The interface may be a series of holes in the surface of the vacuum chamber 16 that faces the belt 16 along the capture surface.

The vacuum chamber 30 may be configured to generate a higher vacuum (i.e. a lower relative air pressure) towards the deposition roller 18 end of the belt 16 and a lower vacuum (i.e. a higher relative air pressure) towards the first conveyor roller 17 end of belt 16. The variable level of vacuum may be configured by the size and number of holes in the surface of the vacuum chamber 30 that faces the capture surface of the tape conveyor 14.

Tape conveyor 14 may run at a constant speed. In this way the belt 16 moves around the rollers 17, 18, 19 at a constant speed. The vacuum chamber 30 pulls the tape 4 onto the belt 16. However, until the tape cutter 13 cuts the length of tape 4 the tape 4 cannot move with the belt 16. Therefore, the tape 4 slips over the belt 16. It can be advantageous to have a variable level of vacuum produced by the vacuum chamber and preferably a lower vacuum being produced at the end of the vacuum chamber closest to the tape cutter 13. This means that the vacuum chamber 30 does not pull the tape 4 on to the belt 16 too tightly before cutting occurs. This avoids damaging and/or stretching the tape 4. Once the tape 4 has been cut into a length of tape 4 then it is desirable for the length of tape 4 to be held tightly against the belt 16 as it is transferred to the deposition platform 15. Therefore, a higher vacuum towards the deposition platform 15 end of the belt 16 it preferable as it means that the length of tape 4 is held in position.

The tape deposition system 1 comprises a glue spay 31. The glue spray 31 is supplied with glue from a glue supply 32. The glue supply 32 may pump the glue along a pipe 33 to the glue spray 31. The glue spray 31 is positioned to deposit glue on to the length of tape 4 whilst the length of tape 4 is located on the belt 16. The glue spray 31 may be located to spay glue on to the length of tape 4 where the belt 16 contacts with the deposition roller 18. This ensures that the glue is deposited on to the length of tape 4 just before the length of tape 4 is deposited on to the deposition platform 15. The glue spray 31 may comprise an actuator to open a valve to permit the flow of pressurised glue from the glue pipe 33 to the glue spay 31 so that the glue spray 31 can spray glue on to the length of tape 4. The glue supply 32 may pressurise the glue being delivered to the glue pipe 33.

The tape deposition system 1 may be described as comprising a tape deposition head. The tape deposition head is configured to apply lengths of tape to the deposition surface 34 of the deposition platform 15. The tape deposition head may therefore comprise the parts of the tape deposition system 1 that cause the application of the lengths of tape 4 to the deposition platform 15. For instance, the tape deposition head may comprise the tape conveyor 14. The tape deposition head may comprise the tape cutter 13. The tape deposition head may be provided with tape by a tape supply. The tape supply may be configured to deliver a continuous length of tape to the tape deposition head. Thus, the tape supply may comprise the parts of the tape deposition system 1 that cause the delivery of tape to the tape deposition head. For instance, the tape supply may comprise the reel 3 of tape 4. The tape supply may comprise the tape buffer 6. The tape supply may comprise the tape splicer 11.

As discussed herein, the tape deposition system 1 comprises a deposition platform 15. The deposition platform 15 is runs around a track 32. In this way, the deposition platform 15 is moveable around a path. The deposition platform 15 is configured to run around the path in a first direction. The path is a loop. The first direction is chosen such that the deposition platform 15 runs past the tape conveyor 14 in the same direction as the belt 16 is moving around deposition roller 18. The movement of the deposition platform 15 past the deposition roller 18 is timed so that the start of the length of tape 4 is on the underside of the deposition roller 18 when the deposition platform 15 is moving underneath the deposition roller 18. This means that the length of tape 4 can be deposited on to a deposition surface of the deposition platform 15. The deposition surface may be an upper surface of the deposition platform 15. The deposition surface may equally be lengths of tape that have already been deposited on to the deposition platform 15 or may be a combination of the two.

The length of tape 4 is forced from the deposition roller 18 towards the deposition platform 15 by an air jet shown generally by 36. The air jet 36 may be fired from within deposition roller 18 if the deposition roller 18 is porous. The vacuum provided by the vacuum chamber 30 ends just before the air jet 36. In this way, the length of tape 16 is secured to the belt 16 until the point that it is forced towards the deposition platform by the air jet 36. The air jet 36 compresses the length of tape 4 on to the deposition surface 34 of the deposition platform 15. As glue has been applied to the underside of the length of tape 4, as orientated when the length of tape 4 is applied to the deposition surface 34, the tape 4 is adhered to the deposition surface 34. The air jet 36 may be advantageous because the deposition head does not need to be in direct contact with the deposition surface 34. There can be a spacing between the deposition head and the deposition surface 34 meaning that the system can accommodate variable thicknesses of material on the deposition surface 34 which depositing the next length of tape. The tape deposition system 1 comprises an air outlet from which the air jet 36 emanates. The air outlet may be located within the deposition roller 18. The tape deposition system may comprise a compressed air source to supply air to the air outlet to generate air jet 36. The compressed air source may be generated by the vacuum chamber 30 as a consequence of generating the vacuum.

Figure 3:
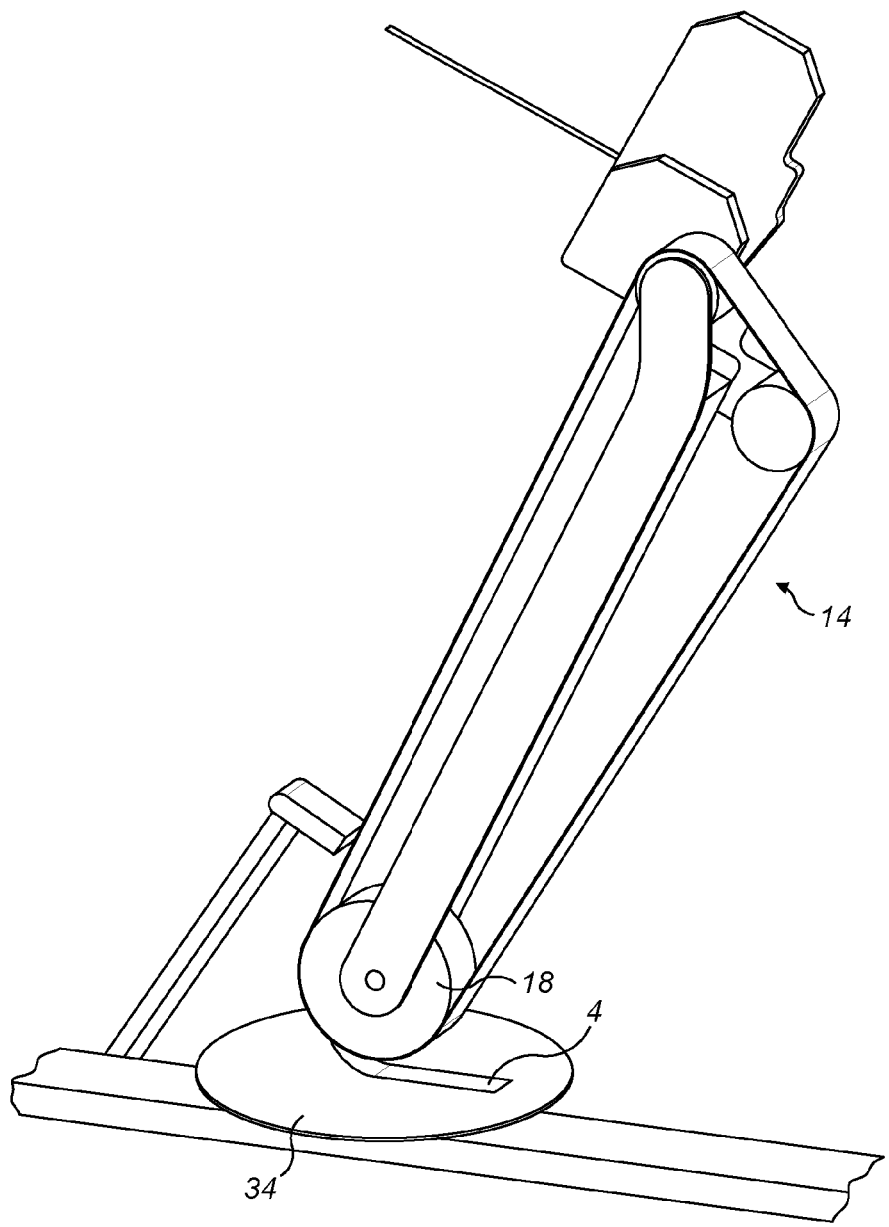
FIG. 3 shows a schematic perspective view of the tape deposition system.

FIG. 3 shows a perspective view of the deposition system 1. In this figure, it can be seen that the length of tape 4 is applied to the deposition surface 34 as a strip of tape across the surface of the deposition surface 34 along the motion path of the deposition platform 15.

Figure 4:
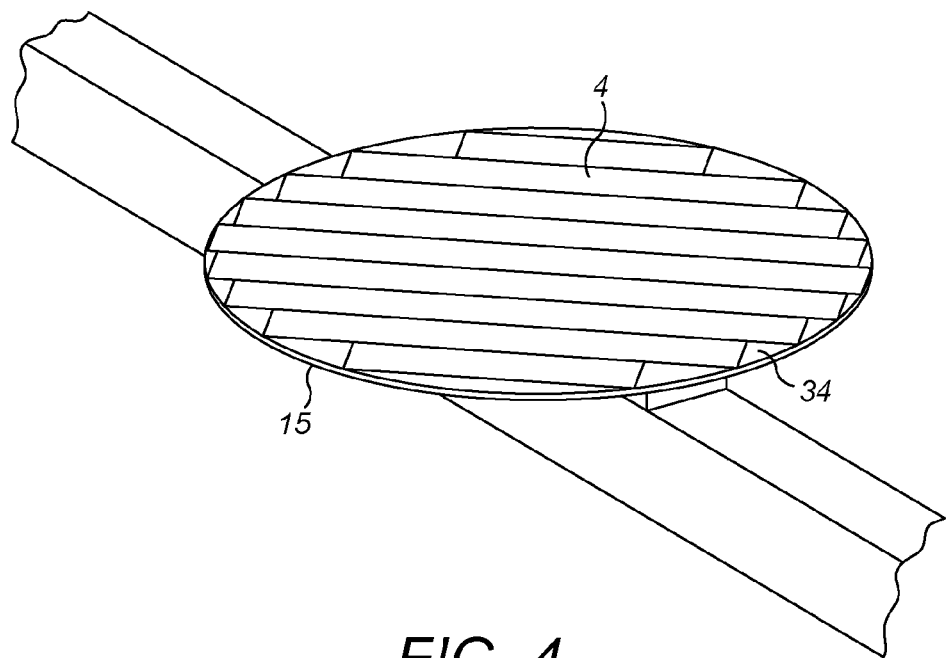
FIG. 4 shows a schematic perspective view of a deposition platform.

The deposition platform 15 may run around the track 32 multiple times so that multiple lengths of tape 4 can be applied to the deposition surface. As discussed herein, those lengths of tape 4 may overlap in areas that required multiple thicknesses of tape and/or tapes running in multiple directions. An example of a deposition surface 34 which had had multiple lengths of tape 4 applied to it is shown in FIG. 4 which shows a perspective view of the deposition surface 34. The deposition platform 15 may be capable of rotating relative to its motion direction so that the lengths of tape 4 can be applied in selected directions across the deposition surface 34. The deposition platform 15 may be capable of moving in a transverse direction relative to its motion direction so that the lengths of tape 4 can be applied at selected offsets from each other. The rotation and offset of the deposition platform 15 may be continuously variable between defined end points. The rotation may be such that lengths of tape 4 can be applied to the deposition platform at any rotational angle.

Whilst only one deposition platform 15 has been described in relation to FIGS. 1 to 4, the tape deposition system 1 may comprise a plurality of deposition platforms 15 that run around the track 32. A length of tape can be applied to each deposition platform as it passes the deposition roller 18. This means that for each transit of the deposition platform 15 around the track multiple articles can be built up across the plurality of deposition platforms 15 that run around the track 32.

Figure 5:
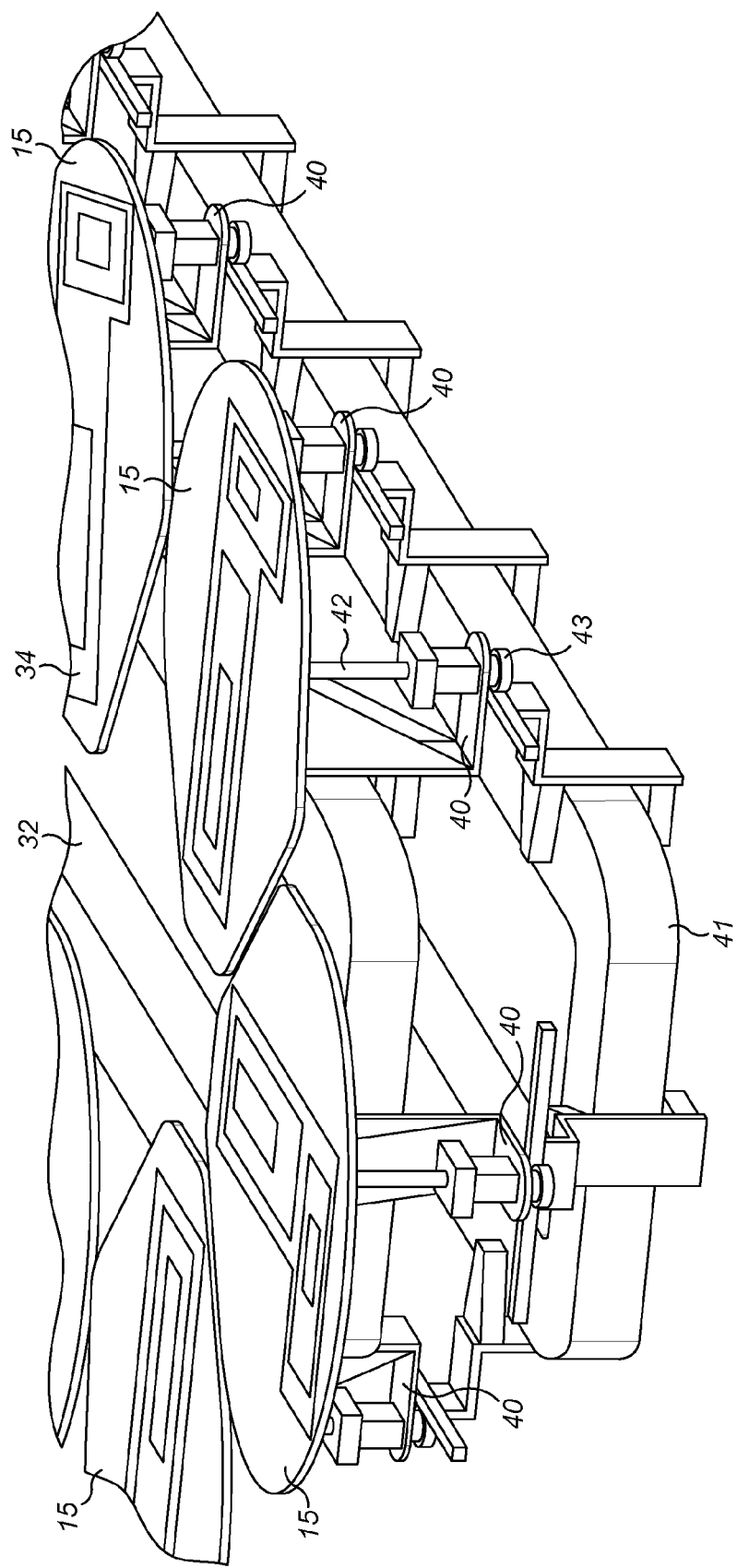
FIG. 5 shows a schematic view of a track system for the deposition platform.

One example system of how the deposition platform 15 may be caused to rotate is shown in FIG. 5. This figure shows a perspective view of the track 32 and a plurality of deposition platforms 15. Each deposition platform 15 has a carriage 40 associated with it. The carriage 40 bears the deposition platform 15 and carries it around track 32 so that the deposition platform 15 moves around its motion path. The carriage 40 is caused to move around the track 32 by a first linear motor. The track 32 may comprise one side of the first linear motor and the carriage 40 may comprise the other side of the first linear motor. The first linear motor may be able to selectively move each carriage 40 along the track 32. The selective movement may be by selectively energising and de-energising the first linear motor. The carriage 40 may be driven around the track 32 using any suitable means. For instance, as an alternative example, each carriage 40 may comprise an electric motor which drives a wheel that contacts with the track 32 to drive the carriage 40 around the track 32.

As discussed herein, the deposition platform 15 may be caused to rotate about an axis perpendicular to the deposition surface 34 so that tape can be deposited on to the deposition surface 34 along selected directions. The deposition platform 15 may be pivotally attached to the carriage 40 to permit the deposition platform 15 to rotate about an axis perpendicular to the deposition surface 34. The deposition platform 15 may be driven about the rotation axis to cause the deposition platform 15 to rotate.

The deposition platform 15 may be driven using any suitable means. For instance, the carriage may comprise an electric motor which is coupled to the deposition platform 15 to cause it to rotate about the rotation axis. In another example, as shown in FIG. 5, the tape deposition system 1 may comprise a second track 41 that follows a second path. The second track 41 may run along a second path offset from the first path that the first track 32 follows. As shown in FIG. 5, the offset may be a horizontal and vertical offset. However, the offset may be just horizontal or vertical. A mover 42 is connected to the second track 41. The mover 42 is connected to the deposition platform 15 to control the rotational position of the deposition platform 15 around the rotation axis.

The mover 42 may be connected to an arm that is attached to the deposition platform at a position offset from the rotation axis so that a relative movement of the mover 42 relative to the carriage 40 associated with a particular deposition platform 15 causes the deposition platform 15 to rotate about the rotation axis. In an alternative example, as shown in FIG. 5, the deposition platform 34 may be attached to an axle 42 that is rotationally connected to the carriage 40. The axle 42 may comprise a wheel 43. The mover 42 contacts the wheel 43 so that a relative motion of the mover 42 relative to the carriage 40 causes the mover 42 to rotate the wheel 43. The rotation of the wheel 43 causes the deposition platform 34 to rotate about the rotation axis.

The mover 42 may be driven around the second track 41 using any suitable means. For instance, each mover 42 may comprise an electric motor which drives a wheel that contacts with the second track 41 to drive the mover 42 around the second track 41. In another example, as pictured in FIG. 5, the mover 42 is caused to move around the second track 41 by a second linear motor. The second track 41 may comprise one side of the second linear motor and the mover 42 may comprise the other side of the second linear motor. The second linear motor may be able to selectively move each mover 42 along the second track 41. The selective movement may be by selectively energising and de-energising the second linear motor.

As discussed herein, the deposition platform 15 may be configured to move laterally relative to its motion path. For instance, the deposition platform 15 may be mounted to a rack and the carriage 40 may comprise an electric motor to drive the rack to cause the deposition platform 15 to move laterally relative to its motion path.

Figure 6:
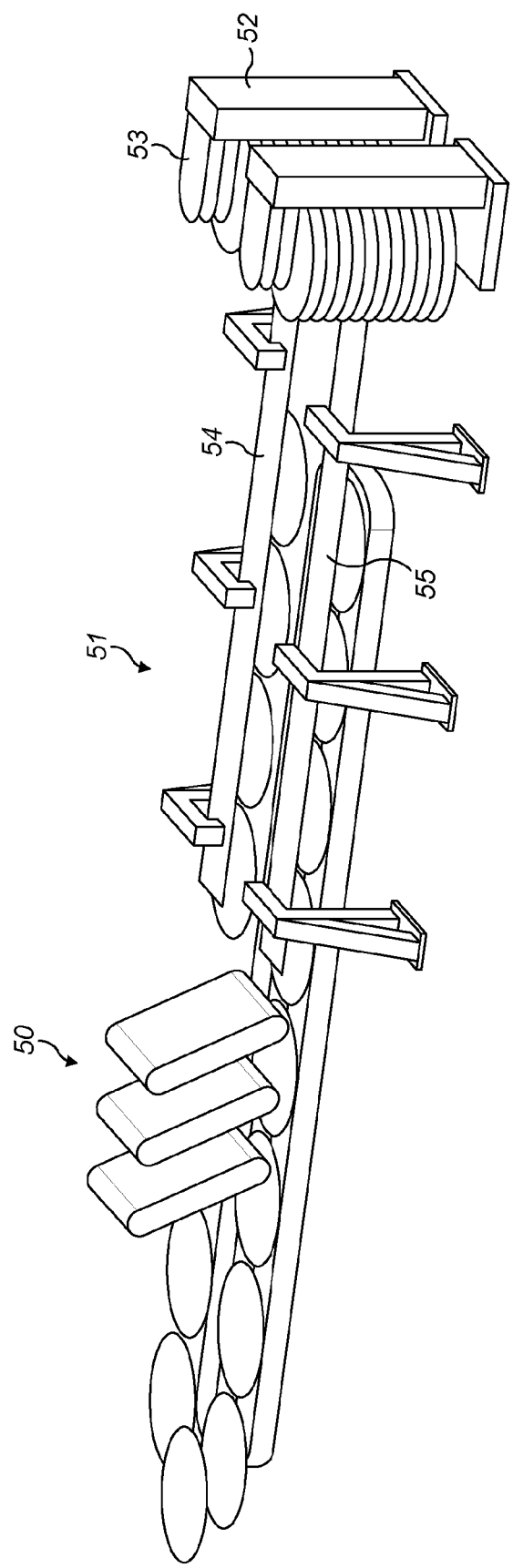
FIG. 6 shows a schematic perspective view of the tape deposition system comprising multiple deposition heads and a platform management system.

Whilst only one tape deposition head has been described in relation to FIGS. 1 to 5, as shown in FIG. 6 the tape deposition system 1 may comprise a plurality of tape deposition heads 50 configured to apply lengths of tape to the deposition surface(s). The plurality of tape deposition heads 50 are positioned so that they can each apply lengths of tape to the deposition surface as the deposition platform passes under the tape deposition heads 50. The plurality of tape deposition heads may all each be able to apply lengths of tape to the deposition surface as the deposition platform passes under the respective tape deposition heads.

As shown in FIG. 6, the plurality of tape deposition heads 50 may be arranged in banks. The tape deposition heads 50 may be arranged into a single bank. The tape deposition heads 50 may be arranged into multiple banks. There may be two or more banks. As shown in FIG. 6, there may be three banks. Within each bank the tape deposition heads 50 may be aligned laterally so that each deposition head deposits a length of tape that runs parallel to the other lengths of tape but that have a longitudinal centreline that is offset from each other in the lateral direction. The lengths of tape from each of the deposition heads 50 may be deposited so that there is no or a minimal gap between the lengths of tape applied by a bank of deposition heads 50. In one example, twenty deposition heads may be arranged in a bank one beside the other. In another example, two banks of deposition heads may comprise ten deposition heads each. The two banks may be offset from each other in the deposition direction as described herein.

Where the tape deposition heads 50 are arranged in multiple banks, at least some of the tape deposition heads 50 in one bank may be aligned along the deposition direction with at least some of the tape deposition heads 50 in another bank. Where the tape deposition heads 50 are arranged in multiple banks, all of the tape deposition heads 50 in one bank may be aligned along the deposition direction with a tape deposition head in another bank. In another option, the tape deposition heads 50 in one bank may be offset from the tape deposition heads 50 in another bank so that their deposition directions are offset from each other in a direction perpendicular to the deposition direction.

The tape deposition system 1 may comprise a platform management device 51. The platform management device 51 is configured to move the deposition platforms 15 between a deployed position where the deposition platform 15 is able to run around the path and a storage location 52. The platform management device 51 may be configured to move the deposition platforms 15 between their respective carriages 40 and the storage location. The deposition platforms 15 may be keyed on their underside and the carriages 40 may have an opposite keying so that the deposition platform 15 can lock to the carriage 40 when deployed by the platform management device 51 on to the carriage 40.

One example of the platform management device 51 is shown in FIGS. 6 and 7. FIG. 6 shows the platform management device 51 comprising a storage location 52.

The storage location 52 is capable of storing one or more deposition platforms 15. As shown in FIG. 6, the storage location 52 is capable of storing a plurality of deposition platforms 15 at any one time. The storage location 52 may comprise a series of shelves 53. A deposition platform 15 may be placed on to a shelf 53 for storage. The platform management device 51 comprises an unloading conveyor 54 to move the deposition platforms from a deployed position to the storage location 52. The platform management device 51 comprises a loading conveyor 55 to move the deposition platforms 15 from the storage location 52 to a deployed position. The loading and unloading conveyor may be joined together so that a deposition platform 15 placed on the combined conveyor from the storage location 52 moves towards a deployed position and a deposition platform 15 placed on the conveyor from being in a deployed position moves towards the storage location 52.

FIG. 7 shows one example system for deploying and removing the deposition platforms 15 from the motion path (e.g. the on and off of track 32). The platform management device 51 may comprise a moveable portion 60 to one or both of the loading and unloading conveyors 55, 54.

Figure 7A:
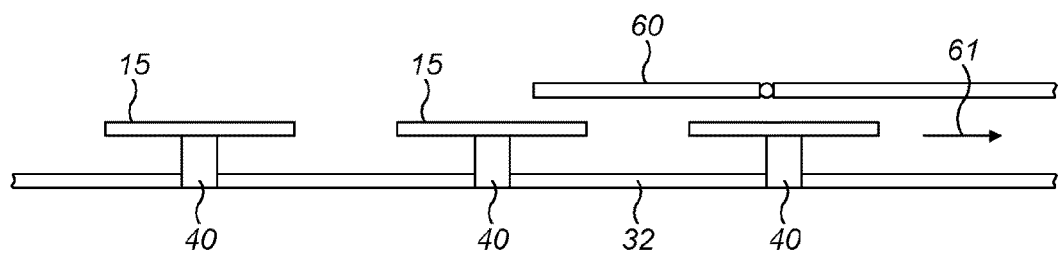
FIG. 7 shows schematic views of a first example of components of the platform management system.
Figure 7B:
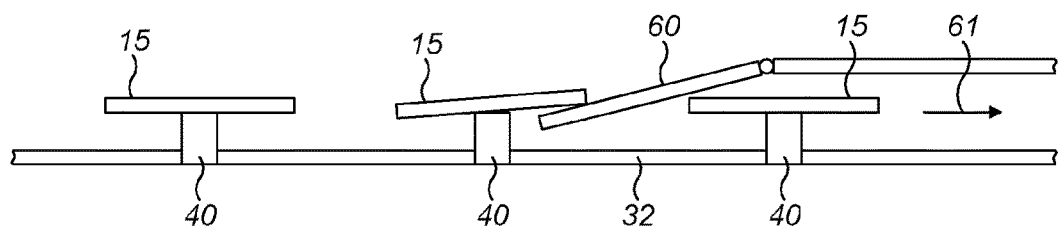
Figure 7C:
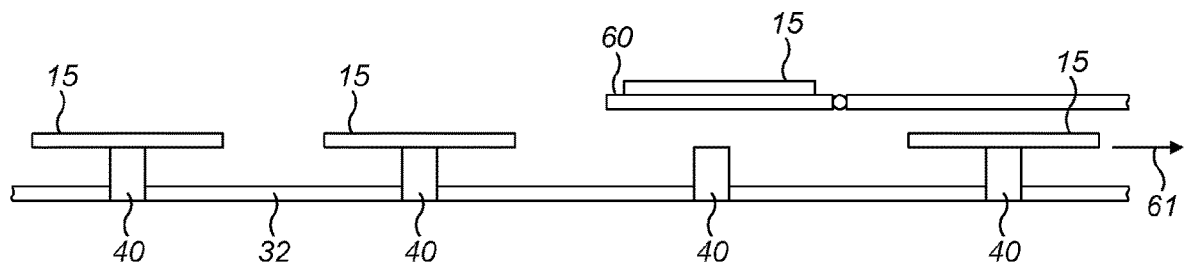

The moveable portion 60 is usually positioned in the raised position shown in FIG. 7a so that is does not interfere with the motion of the deposition platforms 15. For the unloading process, the moveable portion 60 is located over the track 32 so that when the moveable portion 60 is in a lowered position the moveable portion 60 crosses the motion path (as shown by arrow 61) of the deposition platforms 15. This is as shown in FIG. 7*b*. The deposition platform 15 behind the moveable portion 60 in the motion direction 16 comes into contact with the moveable portion 60 when is the moveable portion 60 is in the lowered position. The deposition platform 15 is then dragged up on to the unloading conveyor 54 and the moveable portion 60 moved to the raised position so as not to impinge on any other deposition platform 15 moving around the track 32. This is as shown in FIG. 7*c*. In this way, a deposition platform 15 can be removed from the track. For the loading process, the movable portion 60 can be used in reverse. The moveable portion 60 lowers to deposit a deposition platform 15 on to the carriage 40 and then raises before the next deposition platform 15 passes the moveable portion 60.

Figure 8:
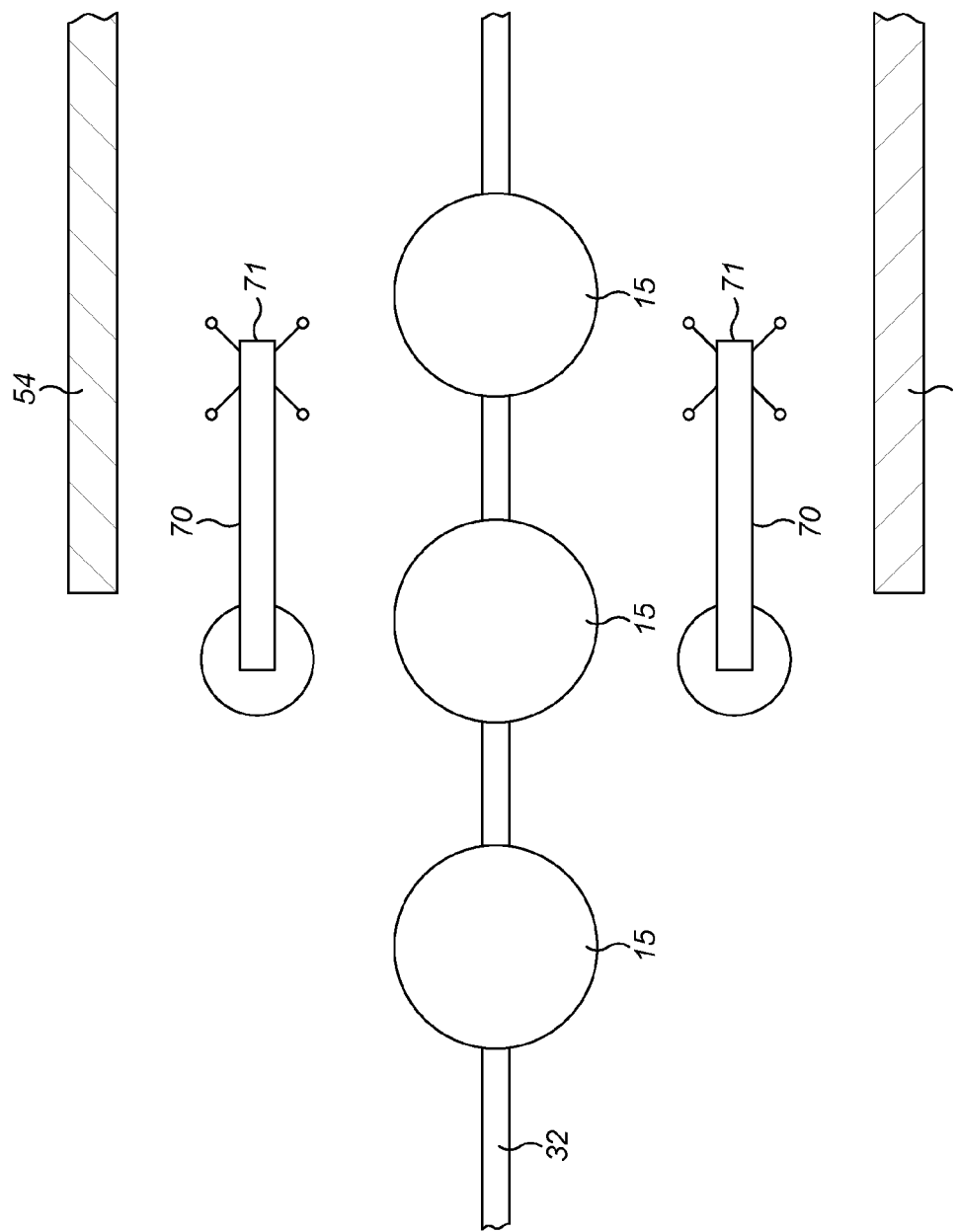
FIG. 8 shows a schematic view of a second example of components of the platform management system.

An alternative example for deploying and removing the deposition platforms 15 from the motion path (e.g. on and off of track 32) is shown in FIG. 8. The platform management device 51 may comprise the components as described with relation to FIG. 6. However, in addition the platform management device 51 may comprise one or more moveable arms 70 to move the deposition platforms 15 between the storage location 52 and/or the loading and unloading conveyors 55, 54. The moveable arms are moveable between a position where a grabbing head 71 overlays the deposition platform 15 whilst the deposition platform 15 is on the track 32 and a position where the grabbing head 71 overlays storage location 52, or, as pictured in FIG. 8, overlays at least one of the loading and unloading conveyor 55, 54. The grabbing head 72 comprises a device for selectively attaching itself to the deposition platform 15. The device may be one or more suction cups. The platform management device 51 may comprise at least one moveable arm 70 that moves platforms to the unloading conveyor 54 and at least one moveable arm 70 that moves platforms from the loading conveyor 55.

The platform management device 51 may comprise a combination of moveable portions 60 and moveable arms 70.

The tape deposition system 1 may comprise a controller 35. The controller 35 may be connected to the components of the tape deposition system 1 to control those components as described herein to deposit lengths of tape on to the deposition surface and manage the deposition platforms. The controller 35 may comprise a processor and a non-volatile memory. The controller may comprise more than one processor and more than one memory. The memory stores a set of program instructions that are executable by the processor, and reference data such as look-up tables that can be referenced by the processor in response to those instructions. The processor may be configured to operate in accordance with a computer program stored in non-transitory form on a machine-readable storage medium. The computer program may store instructions for causing the processor to issue instructions to control the components of the tape deposition system 1 in the manner described herein.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A tape deposition system, the system comprising:
 a platform moveable around a closed path in a first direction, the closed path being a loop, the platform having a deposition surface;
 a tape deposition head comprising a deposition roller, the tape deposition head being configured to apply lengths of tape along a deposition direction to the deposition surface while the platform is moving underneath the deposition roller along the deposition direction and around the closed path;
 a carriage, the platform being borne on the carriage;
 a first track that follows the closed path, the carriage being moveable along the first track; and
 a platform management device configured to move the platform between the closed path and a storage location, the platform management device comprising a conveyor, the conveyor comprising a moveable portion configured to move between a raised position and a lowered position;
 wherein the system is configured to move the platform around the path multiple times to permit multiple lengths of tape to be applied to the deposition surface, and wherein when the moveable portion of the conveyor is in the raised position the moveable portion does not impinge of the motion of the platform along the first track, and when the moveable portion is in the lowered position the moveable portion crosses the path of the platform so that the moveable portion is capable of dragging the platform to and/or from the first track.

2. The deposition system according to claim 1, the system comprising:
 a plurality of platforms movable around the path in the first direction, each platform having a deposition surface and the platforms each being moveable past the deposition head around the path along the deposition direction, wherein the plurality of platforms include the platform; and
 wherein the tape deposition head is configured to apply lengths of tape along the deposition direction to each deposition surface.

3. The deposition system according to claim 1, wherein the platform is rotatable about an axis perpendicular to the deposition surface so that the deposition head can apply lengths of tape to the deposition surface along any direction.

4. The deposition system according to claim 1, wherein the platform is translatable along a translation direction parallel to the deposition surface and perpendicular to the first direction so that the deposition head can apply lengths of tape to the deposition surface at positions offset along the translation direction.

5. The deposition system according to claim 1, wherein at least some lengths of tape are applied to other lengths of tape already applied to the deposition surface.

6. The deposition system according to claim 1, wherein the path is a first path, and the system comprising:
 a second track that follows a second path, the second path running alongside the first track; and
 a mover for each carriage, each carriage being connected to the second track by the respective mover so that relative movement of each carriage relative to the associated mover causes the carriage to rotate about the connection between the carriage and the first track.

7. The deposition system according to claim 1, the system comprising:
a plurality of tape deposition heads configured to apply lengths of tape to the deposition surface along the deposition direction, the plurality of tape deposition heads including the tape deposition head, the platform being moveable past the deposition heads around the path along the deposition direction to apply lengths of tape to the deposition surface.

8. The deposition system according to claim 7, wherein the deposition heads are aligned in a bank one beside the other or are arranged in multiple rows of deposition heads.

9. The deposition system according to claim 8, wherein the deposition heads in one row are offset from the deposition heads in another row so that the deposition directions of the heads are offset from each other in a direction perpendicular to the deposition direction.

10. The deposition system according to claim 1, wherein the platform management device is configured to move the platform between the carriage and the storage location.

11. The deposition system according to claim 1, the platform management device comprising a moveable arm having a grabbing head configured to selectively attach to the platform, the moveable arm being configured to move the platform between the path and a position remote from the path, wherein the position remote from the path is the storage location.

12. The deposition system according to claim 11, wherein the position remote from the path is on the conveyor.

13. The tape deposition system according to claim 1, wherein the first direction and the deposition direction are the same.

14. The tape deposition system according to claim 1, wherein the tape deposition system is configured to time movement of the platform past the deposition roller so that a start of the length of tape is on an underside of the deposition roller when the platform is moving underneath the deposition roller.

15. The tape deposition system according to claim 1, wherein the moveable portion is hinged such that when the moveable portion is in the lowered position, the moveable portion rotates down from the hinge such that a free end of the moveable portion comes into contact with the platform.

16. The tape deposition system according to claim 1, wherein the moveable portion is hinged such that the moveable portion is configured to rotate about the hinge from the lowered position to the raised position to remove the platform from the first track.

17. A tape deposition system, the system comprising:
a plurality of platforms moveable around a closed path in a first direction, the closed path being a loop, each platform of the plurality of platforms having a deposition surface;
a tape deposition head comprising a deposition roller, the tape deposition head being configured to apply lengths of tape along a deposition direction to each deposition surface while each respective platform is moving underneath the deposition roller along the deposition direction and around the closed path; and
a platform management device configured to move the plurality of platforms between the closed path and a storage location, the platform management device comprising a conveyor, the conveyor comprising a moveable portion configured to move between a raised position and a lowered position,
wherein the system is configured to move the plurality of platforms around the path multiple times to permit multiple lengths of tape to be applied to each deposition surface, and when the moveable portion of the conveyor is in the raised position the moveable portion does not impinge of the motion of the plurality of platforms along the closed path, and when the moveable portion is in the lowered position the moveable portion crosses the path of the plurality of platforms so that the moveable portion is capable of moving more than one platform of the plurality of platforms to and/or from the closed path before the moveable portion returns to the raised position.

18. The tape deposition system according to claim 17, comprising:
a plurality of carriages, each platform of the plurality of platforms being borne on a respective carriage of the respective carriages; and
a first track that follows the closed path, the plurality of carriages being moveable along the first track.

19. The tape deposition system according to claim 17, wherein each platform of the plurality of platforms is rotatable about an axis perpendicular to the deposition surface so that the deposition head can apply lengths of tape to each deposition surface along any direction.

20. A tape deposition system, the system comprising:
a platform moveable around a closed path in a first direction, the closed path being a loop, the platform having a deposition surface;
a tape deposition head comprising a deposition roller, the tape deposition head being configured to apply lengths of tape along a deposition direction to the deposition surface while the platform is moving underneath the deposition roller along the deposition direction and around the closed path;
a carriage, the platform being borne on the carriage;
a first track that follows the closed path, the carriage being moveable along the first track; and
a platform management device configured to move the platform between the closed path and a storage location, the platform management device comprising a conveyor, the conveyor comprising a moveable portion configured to move between a raised position and a lowered position;
wherein the system is configured to move the platform around the path multiple times to permit multiple lengths of tape to be applied to the deposition surface, and wherein when the moveable portion of the conveyor is in the raised position the moveable portion does not impinge of the motion of the platform along the first track, and when the moveable portion is in the lowered position the moveable portion crosses the path of the platform so that the moveable portion is capable of moving the platform to and/or from the first track.

* * * * *